United States Patent [19]

Takahashi

[11] 4,305,029
[45] Dec. 8, 1981

[54] POSITIONING CONTROL APPARATUS

[76] Inventor: Shuichi Takahashi, 1-1-16 Takaidoshigashi, Suginamiku, Tokyo, Japan

[21] Appl. No.: 63,847

[22] Filed: Aug. 6, 1979

[30] Foreign Application Priority Data

Sep. 14, 1978 [JP] Japan .................................. 53-112200

[51] Int. Cl.³ ............................................ G05B 19/28
[52] U.S. Cl. ................................... 318/603; 318/602; 318/685; 318/721
[58] Field of Search ............... 318/603, 602, 696, 721, 318/685, 607

[56] References Cited

U.S. PATENT DOCUMENTS

| | | | |
|---|---|---|---|
| 3,370,289 | 2/1968 | Hedgcock et al. | 318/602 X |
| 3,599,068 | 8/1971 | Kanomori et al. | 318/603 X |
| 3,826,964 | 7/1974 | Byrne | 318/602 |
| 4,081,732 | 3/1978 | Aoyama | 318/603 |
| 4,095,157 | 6/1978 | Klauser | 318/685 X |
| 4,107,594 | 8/1978 | Jacobs | 318/685 |

Primary Examiner—B. Dobeck
Attorney, Agent, or Firm—Spensley, Horn, Jubas & Lubitz

[57] ABSTRACT

A polyphase synchronous motor is rotated by a unit incremental angle for each pulse input to the motor control circuit. The position error between the reference position and the controlled position of an object connected to the motor is detected. The direction of the motor rotation is controlled by the polarity of the detected position error, and the frequency of the input pulse to the motor control circuit is maintained to be proportional to the magnitude of the detected position error. But this frequency is limited in a predetermined range, when the magnitude of the detected position error exceeds the corresponding limit.

2 Claims, 2 Drawing Figures

POSITIONING CONTROL APPARATUS

BACKGROUND OF THE INVENTION

This invention relates to a positioning control apparatus for a synchronous motor.

A positioning control apparatus for a synchronous motor was disclosed in detail by a U.S. Pat. No. 4,151,449 entitled "Positioning Control Apparatus" (hereafter will be called the prior invention) owned by the same applicant of the present invention.

The positioning control apparatus disclosed by the prior invention belongs to an open-loop control system in which the control of a synchronous motor is performed in a way similar to that of a stepping motor.

As is well known, there are several demerits which are inherent to an open-loop positioning control system. For example, a momentary power failure may cause the evaporation of the memory in the register which stores the coded signal representing the instantaneous angular position $\phi$, and then, when the power is restored, the motor may follow to an angular position indicated by the new contents of the register which has no relation to the position $\phi$.

A closed-loop positioning control apparatus for a synchronous motor was also disclosed in detail by a U.S. Pat. No. 4,051,419, entitled "Control System of an Alternating-Current Motor" owned by the same applicant of this invention. But the control apparatus disclosed by the U.S. Pat. No. 4,051,419 is rather complicated and is not adapted to be used for a small-power synchronous motor. And the open-loop type control apparatus disclosed by the prior invention can be transformed to a closed-type positioning control apparatus when an error-detecting device is supplemented to the apparatus and the input pulse frequency is kept to be proportional to the amount of the error signal.

It is, therefore, a principal object of the present invention to provide a control apparatus whereby a closed-loop positioning control is attained by a simple attachment to the open-loop type control apparatus disclosed by the prior invention.

These and other objects of the present invention will become manifest upon a study of the following description and the accompanying drawings.

SUMMARY OF THE INVENTION

In one illustrative embodiment of the present invention, a N-phase synchronous motor is controlled, just in the same way as in the prior invention, by controllable power supplies which supply instantaneous phase currents respectively proportional to cos $\phi$, cos $(\phi - 2\pi\phi N)$, ... cos $\{\phi - (k-1)2\pi/N\}$, ... cos $\{\phi - (N-1)2\pi/N\}$ to each of the N phase windings where $\phi$ is the reference electrical position angle of the motor. In the embodiment of the present invention, there is also provided an up-down counter, just in the same way as in the prior invention, which stores a digital code representing the angular position $\phi$. In the prior invention, an input pulse to the up-down counter meant a primary command for a unit increment (or decrement) of the angular position, and the motor simply followed to the command. In the present invention, however, the primary command is given as a reference angular position $\theta_i$. The controlled angular position $\theta_o$ is detected and the error angle $\theta_e = \theta_i - \theta_o$ controls the frequency of the input pulse to the up-down counter. Thus, in the system disclosed by the present invention, the motor position is controlled in a closed system to reduce the amount of $\theta_e = \theta_i - \theta_o$ to a minimum.

BRIEF DESCRIPTION OF THE DRAWINGS

Reference will now be made to the accompanying drawings in which.

DESCRIPTION OF THE INVENTION

Figure 1:
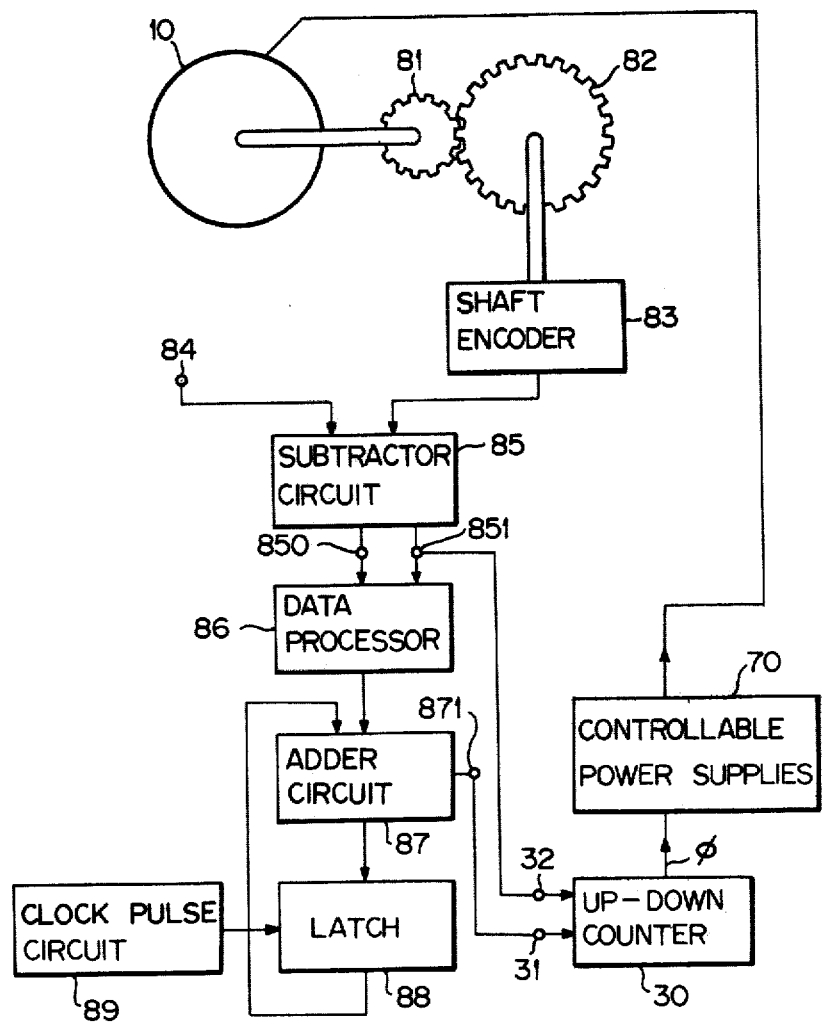
FIG. 1 is a block diagram of an embodiment of this invention.

Referring now to FIG. 1 in which a block diagram of an embodiment of the present invention is illustrated, a polyphase synchronous motor 10 drives and controls the position of a controlled apparatus (not shown in the drawing) through the gear 81, 82. A shaft encoder 83 connected to the gear 82 detects the controlled position $\theta_o$ of the controlled apparatus. The digital code representing the reference position is received on the input terminal 84. A subtractor circuit 85 operates an algebraic subtraction $\theta_e = \theta_i - \theta_o$ to generate the error angle code $\theta_e$ and transmits the digital code representing the amount of $\theta_e$ ($|\theta_e|$) to the terminal 850 and transmits one bit code representing the polarity of $\theta_e$ to the terminal 851. The output lines from the shaft encoder 83, those from the terminal 84, and those from the terminal 850 are respectively shown by a single line in FIG. 1 in order to simplify the drawing. But it must be understood that as many lines as the number of parallel bits are required in the bit parallel output system. This simplified representation will also be employed in all the attached drawings. The data processor 86 in the embodiment shown in FIG. 1 is a limiter circuit which receives $|\theta_e|$ and transmits $E = E_m$ where $|\theta_e| \geq E_{m'}$ or transmits $E = |\theta_e|$ where $|\theta_e| < E_m$. An accumulator comprises the adder circuit 87, the latch 88 and the clock pulse circuit 89. When the modulo of the accumulator is denoted by Q, an overflow pulse representing the value Q is generated at the carry terminal of the most significant bit stage at each time when the sum at the adder circuit 87 becomes not less than Q. The number of the overflow pulses M which is generated at the terminal 871 in one second is represented by an equation $M = EF/Q$; where E represents the output value from the limiter circuit 86 and F (Hz) represents the output frequency of the clock pulse circuit 89. It is assumed that the up-down counter 30 is a binary 8 bit counter and that the most significant bit represents the angle of $2\pi/2^1$ (radian), the least significant bit will represent $2\pi/2^8$ (radian), and an overflow pulse which is supplied to the counter 20 through the terminal 31 corresponds to the angular increment of $\Delta\phi = 2\pi/2^8$.

Where $\theta_e \geq 0$, the counter 30 is controlled, by the control input from the terminal 32, to up-count the input pulse from the terminal 871. Where $\theta_e < 0$, the counter 30 is controlled by the control input from the terminal 32, to down-count the input pulse from the terminal 871.

As will be described in a later paragraph, the angular position of the synchronous motor 10 is controlled to be equal to the angular position represented by the contents $\theta$ of the counter 30 and controls the angular position $\theta_o$ of the shaft encoder 83 through the gears 81, 82. Where $\theta_e$ ($= \theta_i - \theta_o$) $\geq 0$, the counter 30 increases the contents $\phi$ as an upcounter whereby increasing the controlled angular position $\theta_o$. Where $\theta_e < 0$, the counter 30 decreases $\phi$ as a downcounter thereby decreasing the controlled angular position $\theta_o$; and where $\theta_e=0$, there will be no overflow pulse from the adder circuit 87 and at this angular position the motor 10 stops. Therefore the angular position of the motor 10 is feedback controlled in such a way as to make $\theta_o=\theta_i$.

In the embodiment shown by FIG. 1, it was assumed that the data processor 86 was a limiter circuit limiting the upper and the lower limit on the error angle $\theta_e$ which is generated from subtractor circuit 85, for use as a manipulated variable E.

But, in a general feedback control system, it is usual to compose the manipulated variable Z by adding at least one control action selected from an integral control action and a derivative control action in order to improve the response characteristics of the feedback system. Thus, the manipulated variable Z is, in general, represented by an equation $$Z = \left(\frac{k_1}{p} + k_2 + k_3 p\right) \theta_e \qquad (1)$$

where p represents the differential operator d/dt, $k_1$, $k_2$, $k_3$, are constants (involving the value zero) to be determined by design. At least one of these three constants must not be zero. Therefore the data processor 86 comprises, in general, the circuit for operating the calculation shown by equation (1) and the limiter circuit for imposing the upper and the lower limit on the manipulated variable Z. And in the embodiment shown in FIG. 1, it was further assumed that the upper and the lower limit of $\theta_e$ have the same absolute value $E_m$, and the data processor 86 required only $|\theta_e|$ as the input. But, in general, the manipulated variable Z is limited in a region as indicated by Z min$\leq$Z$\leq$Z max, where Z max$>0$, Z min$<0$, and Z min$\neq$Z max. Therefore, it is necessary that both the absolute value $|\theta_e|$ and the sign code representing the polarity of $|\theta_e|$ must be received by the data processor 86.

In the embodiment as shown in FIG. 1, the position error $\theta_e$ was generated in a digital form by the subtractor circuit 85 which receives the output signal $\theta_o$ of the shaft encoder 83 and the reference position signal $\theta_i$ from the terminal 84.

But it is apparent that any heretofore known position error detector may be employed in this invention; for example, when a synchro transmitter and the synchro controlled transformer are used, the position error $\theta_e$ is detected as an analog amount, and then this analog amount may be converted to a digital code by an A-D converter.

The controllable power supplies 70 are the same to those of the prior invention, and an embodiment will be here described.

Figure 2:
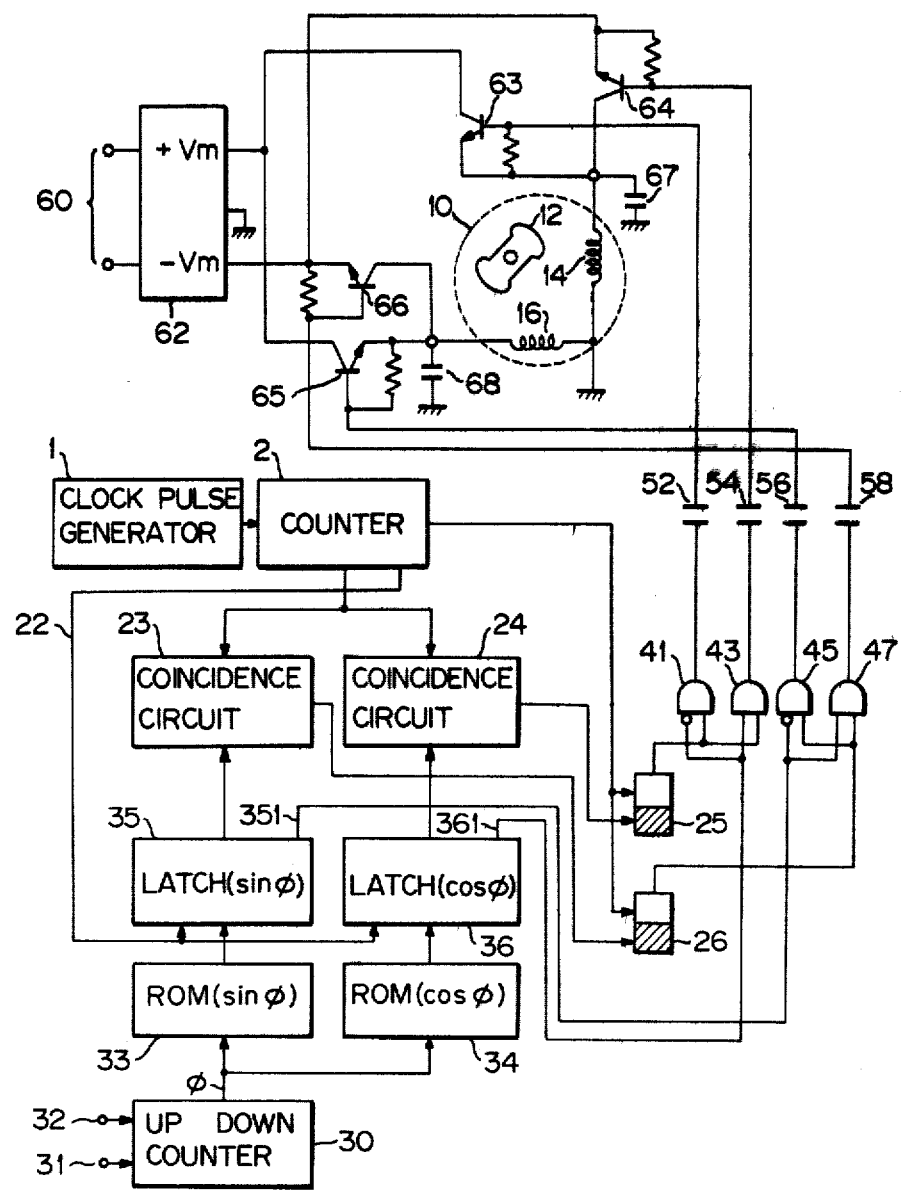
FIG. 2 is a circuit diagram of controllable power supplies as shown by a block in FIG. 1.

FIG. 2 is a circuit diagram showing an example of the controllable power supplies as shown in FIG. 1. The same numerals in FIG. 2 and FIG. 1 show the same or the corresponding part. In FIG. 2, the number N of the phases of the polyphase synchronous motor 10 is shown as 4 and the rotor 12 is shown as a permanent magnet having a single pair of magnetic poles. A synchronous motor which has two stator windings 14 and 16 spaced at right angle to each other, is generally called a two phase motor. But the synchronous motor 10 in FIG. 2 may be considered as a four phase (N=4) motor in which the third phase stator winding is united with the first phase stator winding 14 and the fourth phase stator winding is united with the second phase stator winding 16. Thus, the third phase current $$I \cos \{\phi - 2(2\pi/4)\} = -I \cos \phi$$

flows in the direction opposite to the first phase current $I \cos \phi$, and the fourth phase current $$I \cos\{\phi - 3(2\pi/4)\} = -I \cos\left(\phi - \frac{2\pi}{4}\right)$$

flows in the direction opposite to the second phase current $$I \cos\left(\phi - \frac{2\pi}{4}\right).$$

A d.c. power source 62 receives a commercial frequency power supply from the terminal 60 and generates a positive d.c. voltage $+Vm$ and a negative d.c. voltage $-Vm$ of a same magnitude. Transistor chopper circuits 63, 64, 65 and 66 are connected between the power source 62 and the stator windings 14 and 16. Capacitors 67 and 68 are connected in parallel to the windings 14 and 16 respectively.

A clock pulse generator 1 generates a clock pulse of a sufficiently high frequency and a pulse counter 2 counts this clock pulse.

Coincidence circuits 23 and 24 detect the coincidence of the lower 7 bits between the output of the counter 2 with the output of the latches 35 and 36 respectively.

The ROM (Read Only Memory) 33 and the ROM 34 are addressed by the contents $\phi$ of the up-down counter 30 and the magnitude and the sign of sin $\phi$ and cos $\phi$ are respectively read out. The output of the ROM 33 is transferred to a latch 35 and the output of the ROM 34 is transferred to a latch 36 at a predetermined count-phase of the counter 2, by a pulse which is transmitted through the line 22. The latches 35, 36 transmit the polarity sign of sin $\phi$, cos $\phi$ through the lines 351 and 361 respectively, and transmit the codes for $|\sin \phi|$, $|\cos \phi|$ to the coincidence circuits 23 and 24. The other sides of the coincidence circuits 23 and 24 receive the contents of the counter 2.

The flipflops 25 and 26 are set by the overflow pulse generator each time when the count phase of the counter 2 becomes zero. It will be assumed that the frequency of the output pulse at the clock pulse generator 1 is 128 kHz and that the counter 2 is a seven bit binary counter. The frequency of the overflow pulse from the counter 2 will be 1 kHz. And when the count phase of the counter 2 is coincident to the value of $|\sin \phi|$, a pulse is generated from the coincidence circuit 24 to reset the flipflop 26. In the same way, when the count phase of the counter 2 is coincident to the value of $|\cos \phi|$, a pulse is generated from the coincident circuit to reset the flipflop 25.

Therefore the time width during which the flipflop 25 or 26 remains set is respectively proportional to $|\cos \phi|$ and $|\sin \phi|$.

When cos $\phi>0$, the gate 41 keeps the transistor 63 conducting for a duration proportional to cos $\phi$ to flow the current in a positive direction through the winding 14. When cos $\phi<1$, the gate 43 keeps the transistor 64 conducting for a duration proportional to $|\cos \phi|$ to flow the current in a negative direction through the winding 14. When sin $\phi > 0$, the gate 45 keeps the transistor 65 conducting for a duration proportional to $|\sin \phi|$ to flow the current in a positive direction through the windings 16. And when sin $\phi < 0$ the gate 47 keeps transistor 66 conducting for a duration proportional to $|\sin \phi|$ to flow the current in a negative direction through the winding 16.

Thus, the average magnitudes of the currents in the windings 14 and 16 become proportional to cos $\phi$, sin $\phi$ respectively.

It is obvious that these stator currents produce a stator magnetic field in the direction of the reference angular position $\phi$, and the rotor 12 stops at an angular position which corresponds to the reference angular position $\phi$.

In the embodiment shown in FIG. 2, the polyphase synchronous motor 10 has two stator windings 14 and 16 spaced at right angle to each other. When a synchronous motor 10 is a three phase motor which has 3 stator windings spaced at 120° separated from each other, three ROMs must be provided for reading out the absolute values and the polarity code for cos $\phi$, cos $(\phi - 2\pi/3)$ and cos $(\phi - 4\pi/3)$ when addressed by the contents $\phi$ of the up-down counter 30. The latches and the coincidence circuits must also be provided one each for each ROM to control the current of each stator winding equal to I cos $\phi$, I cos $(\phi - 2\pi/3)$ and I cos $(\phi - 4\pi/3)$ respectively.

Similarly, when the synchronous motor 10 is a N-phase synchronous motor which has N stator windings spaced at $2\pi/N$ to each other, the controllable power supplies 70 may be designed to flow the current of magnitude representing I cos $\phi$, I cos $(\phi - 2\pi/N)$, I cos $\{\phi - 2(2\pi/N)\}, \ldots$ I cos $\{\phi(N-1)(2\pi/N)\}$ through each stator windings.

It will be apparent that the clock pulse circuit 89 shown in FIG. 1 may process the output pulse from the generator 1 (FIG. 2) to generate the required clock pulse or may generate the appropriate frequency pulse independently.

In the prior invention, the synchronous motor 10 is controlled in an open-loop system by transmitting the count pulse to the terminal 31 of the up-down counter 30, the direction of the rotation of the motor 10 being controlled by the signal to the terminal 32.

In the present invention, the position error detectors 83, 84 and 85, data processor 86 and the accumulator comprising 87, 88 and 89 are supplemented to compose a feedback control system. Thus in case of a momentary power failure and the resultant disappearance of the contents of the up-down counter 30, the synchronous motor 10 is feedback controlled to make the error angle $\theta_e = \theta_i - \theta_o$ to a minimum when power supply recovers. Therefore there are no danger of controlling the synchronous motor 10 to erroneous angular position in a momentary supply failure. Moreover, in the present invention, the response characteristics of the control system can be easily improved by adding at least one control action selected from an integral control action and a derivative control action.

What I claim is:

1. A positioning control apparatus comprising:
   a polyphase synchronous motor for controlling the position of an object;
   an error signal generator means for generating an error signal representing the magnitude of the position error between a predetermined reference position and the controlled position of said object and for generating a polarity signal representing the direction of the position error;
   a data processor means, connected to said error signal generator means, for generating a modification signal which is a function of the error signal;
   a pulse generator means connected to said data processor means, for generating pulses having a pulse repetition frequency proportional to the magnitude of the modification signal; and
   a motor control means for receiving the polarity signal and said pulses generated by said pulse generator, and driving said polyphase synchronous motor in a direction determined by said polarity signal and by a unit incremental angle for each one pulse of said pulses generated by said pulse generator, wherein said motor control means comprises:
   an up-down counter for counting the pulses from the pulse generator, said pulses being counted in a first direction when the polarity signal is positive and counted in a second direction when the polarity signal is negative;
   a polyphase cosine data generator means, connected to the output of said up-down counter, for generating cosine data signals respectively representing cos $\phi$, cos $(\phi - 2\pi/N)$, ... cos $\{\phi - (k-1) 2\pi/N\}, \ldots$ cos $\{\phi - (N-1) 2\pi/N\}$ where $\phi$ is the output of the counter, N is the total number of phases of said polyphase synchronous motor, and K is the sequential order of a phase concerned; and
   a controllable power supply for supplying the polyphase stator windings of said motor, said controllable power supply receiving the cosine data signal for the phase concerned from said polyphase cosine data generator means and controlling the current in said phase winding to maintain said current at a value proportional to said cosine data represented by said received cosine data signal.

2. A positioning control apparatus comprising:
   a polyphase synchronous motor for controlling the position of an object;
   an error signal generator means for generating an error signal representing the magnitude of the position error between a predetermined reference position and the controlled position of said object and for generating a polarity signal representing the direction of the position error;
   a data processor means, connected to said error signal generator means, for generating a modification signal which is a function of the error signal, wherein said data processor means generates said modification signal in a range limited by an upper limit and a lower limit, said signal in said range being proportional $$\text{to} \left( \frac{k_1}{p} + k_2 + k_3 p \right) \theta_e,$$

where p represents the differential operator d/dt, $k_1$, $k_2$ and $k_3$ are constants, at least one of said constants being non-zero, and $\theta e$ represents the error signal;
   a pulse generator means connected to said data processor means, for generating pulses having a pulse repetition frequency proportional to the magnitude of the modification signal; and a motor control means for receiving the polarity signal and said pulses generated by said pulse generator, and driving said polyphase synchronous motor in a direction determined by said polarity signal and by a unit incremental angle for each one pulse of said pulses generated by said pulse generator.

* * * * *